(12) United States Patent
Heise et al.

(10) Patent No.: US 9,009,780 B2
(45) Date of Patent: Apr. 14, 2015

(54) PRIVACY VERIFICATION TOOL

(71) Applicant: Facebook, Inc., Menlo Park, CA (US)

(72) Inventors: Stephen Charles Heise, Los Altos, CA (US); Jean Yang, Cambridge, MA (US); Dwayne Reeves, Mountain View, CA (US); Yiding Jia, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 99 days.

(21) Appl. No.: 13/842,185

(22) Filed: Mar. 15, 2013

(65) Prior Publication Data

US 2014/0282837 A1    Sep. 18, 2014

(51) Int. Cl.
    G06F 17/00    (2006.01)
    H04L 29/06    (2006.01)
    G06F 21/62    (2013.01)

(52) U.S. Cl.
    CPC .... *G06F 21/6245* (2013.01); *G06F 2221/2101* (2013.01); *H04L 63/102* (2013.01)

(58) Field of Classification Search
    None
    See application file for complete search history.

(56) References Cited

U.S. PATENT DOCUMENTS

| | | | | |
|---|---|---|---|---|
| 2009/0193493 A1* | 7/2009 | Becker et al. | ...................... | 726/1 |
| 2009/0222393 A1* | 9/2009 | Ganai | ............................. | 706/46 |
| 2009/0326907 A1* | 12/2009 | Gulwani et al. | ................. | 703/22 |
| 2010/0192130 A1 | 7/2010 | Hawblitzel et al. | | |
| 2012/0017260 A1* | 1/2012 | Narain et al. | ...................... | 726/1 |
| 2012/0192290 A1* | 7/2012 | Barefoot et al. | ................ | 726/28 |

OTHER PUBLICATIONS

Yang et al., "A Language for Automatically Enforcing Privacy", 31 pages, POPL/CSAIL.
Yang et al., "Safe to the Last Instruction: Automated Verification of a Type-Safe Operating System", *PLDI'10*, Jun. 5-10, 2010, 12 pages, ACM 978-1-4503-0019/10/06, Toronto, Ontario, Canada.
Yang et al., "A Language for Automatically Enforcing Privacy", Talk given on Jul. 27, 2011, 42 pages, Google NYC/CSAIL, New York, NY.
Swamy et al., "Secure Distributed Programming with Value-Dependent Types", *ICFP'11*, Sep. 19-21, 2011, 13 pages, ACM 978-1-4503-0865-6/11/09, Tokyo, Japan.
Jayaraman et al., "Automatic Error Finding in Access-Control Policies", *CCS'11*, Oct. 17-21, 2011, 12 pages, ACM 978-1-4503-0948-6/11/10, Chicago, IL.
Yang et al., "A Language for Automatically Enforcing Privacy Policies", *POPL'12*, Jan. 25-27, 2012, 12 pages, ACM 978-1-4503-1083-3/12/01, Philadelphia, PA.

(Continued)

*Primary Examiner* — Fatoumata Traore
(74) *Attorney, Agent, or Firm* — Perkins Coie LLP

(57) ABSTRACT

Systems and methods for protecting the privacy of users by controlling access to the users' data. In particular, some embodiments provide for a higher-level declarative language for expressing privacy policies which can be verified using a computer-aided verification tool. The verification tool uses the expressed privacy policies along with language-level assumptions and assertions in the verification process. For example, high-level models of the privacy policies can be reduced to a simpler verification representation (e.g., a Boolean representation) based on a set of assertions. This verification representation can then be submitted to a constraint solver (e.g., Satisfiability Modulo Theories solver) for verification.

20 Claims, 8 Drawing Sheets

(56) References Cited

OTHER PUBLICATIONS

Yang et al., "A Language for Automatically Enforcing Privacy", Talk given on Mar. 28, 2012, 56 pages, Jeeves/CSAIL.

"The Margrave Policy Analyzer", Retrieved from http://www.margrave-tool.org/ on Mar. 7, 2013, 2 pages.

"Mohawk: A tool for verifying access-control policies", Retrieved from https://code.google.com/p/mohawk/ on Mar. 7, 2013, 1 page.

"Papers and Talks", Retrieved from https://sites.google.com/site/jeevesprogramming/applications on Mar. 7, 2013, 3 pages.

"Satisfiability Modulo Theories", Retrieved from http://en.wikipedia.org/wiki/Satisfiability_Modulo_Theories on Mar. 7, 2013, 7 pages.

Co-Pending U.S. Appl. No. 14/152,109 by Yung, R. et al., filed Jan. 10, 2014.

Co-Pending U.S. Appl. No. 14/243,167 by Pimenova, M. et al., filed Apr. 2, 2014.

Co-Pending U.S. Appl. No. 14/274,460 by Sethi, B. et al., filed May 9, 2014.

Co-Pending U.S. Appl. No. 14/341,028 by Hopkins, K. et al., filed Jul. 25, 2014.

* cited by examiner

PRIVACY VERIFICATION TOOL

TECHNICAL FIELD

Various embodiments of the present invention generally relate to storing and controlling access to information within information storage and retrieval systems. More specifically, various embodiments of the present invention relate to systems and methods for privacy verification.

BACKGROUND

Companies can use network-based storage systems to store a tremendous amount of end-user data. Examples of end-user data include, but are not limited to, addresses, credit card information, photographs, e-mails, healthcare records, financial records, electronic documents, messages, associations with other end-users, and other types of information. In many cases, each user of the storage system establishes a user account and is identified with a unique user identifier (ID). Each end-user account may be protected with a password for security purposes.

An end-user may log into an account with the system by submitting the correct combination of user ID and password associated with the account. In some cases, portions of an end-user's data may be shared with other end-users. In other cases, there can be restrictions placed by the end-user and/or legal requirements on the dissemination and use of the data. As a result, unauthorized dissemination and/or use of the end-user's data can result in dissatisfied customers and potential legal liability. Traditional tools have not allowed for easy verification of the privacy policies set within the storage systems. As such, there are a number of challenges and inefficiencies found in traditional tools for granting access to end-user data.

SUMMARY

Systems and methods are described for providing a privacy verification tool. In some embodiments, a storage and privacy service (SPS) program expressing one or more access control rules can be retrieved from a storage location. Then, using a processor, a verification representation of the SPS program can be generated based on one or more assertions. The verification representation can include evaluating and abstracting the SPS program based on the one or more assertions, generating an intermediate representation by evaluating the SPS program by substituting constants, functions, and let-bound expressions, and/or generating a Boolean and/or integer representation. The verification representation can be submitted to a constraint solver to generate a set of access control outputs. A determination can then be made as to whether the set of access control outputs returned from the constraint solver satisfy a desired set of privacy constraints. In some embodiments, if the set of access control outputs do not satisfy the desired set of privacy constraints, one or more suggestions to fix the SPS program may be generated and presented to a user.

In some embodiments a system can include a database, a verification module, a search module, an assertion module, a suggestion module, and/or a graphical user interface module. The database can have stored thereon a program written in a declarative language which can be used to enforce a set of privacy policies. The verification module can retrieve the program from the database and generate a verification representation of the program (e.g., by reducing the program to a Boolean satisfiability problem). The search module can search over the verification representation to determine if the program satisfies the set of privacy polices. The assertion engine can be used generate one or more assertions (e.g., automatically or through input selections provided by a user). The suggestion module can be configured to generate one or more suggestions for updating the program when a determination is made that the program does not satisfy the set of privacy policies. The graphical user interface module can generate one or more graphical user interfaces that aid in the creation and testing of the program.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
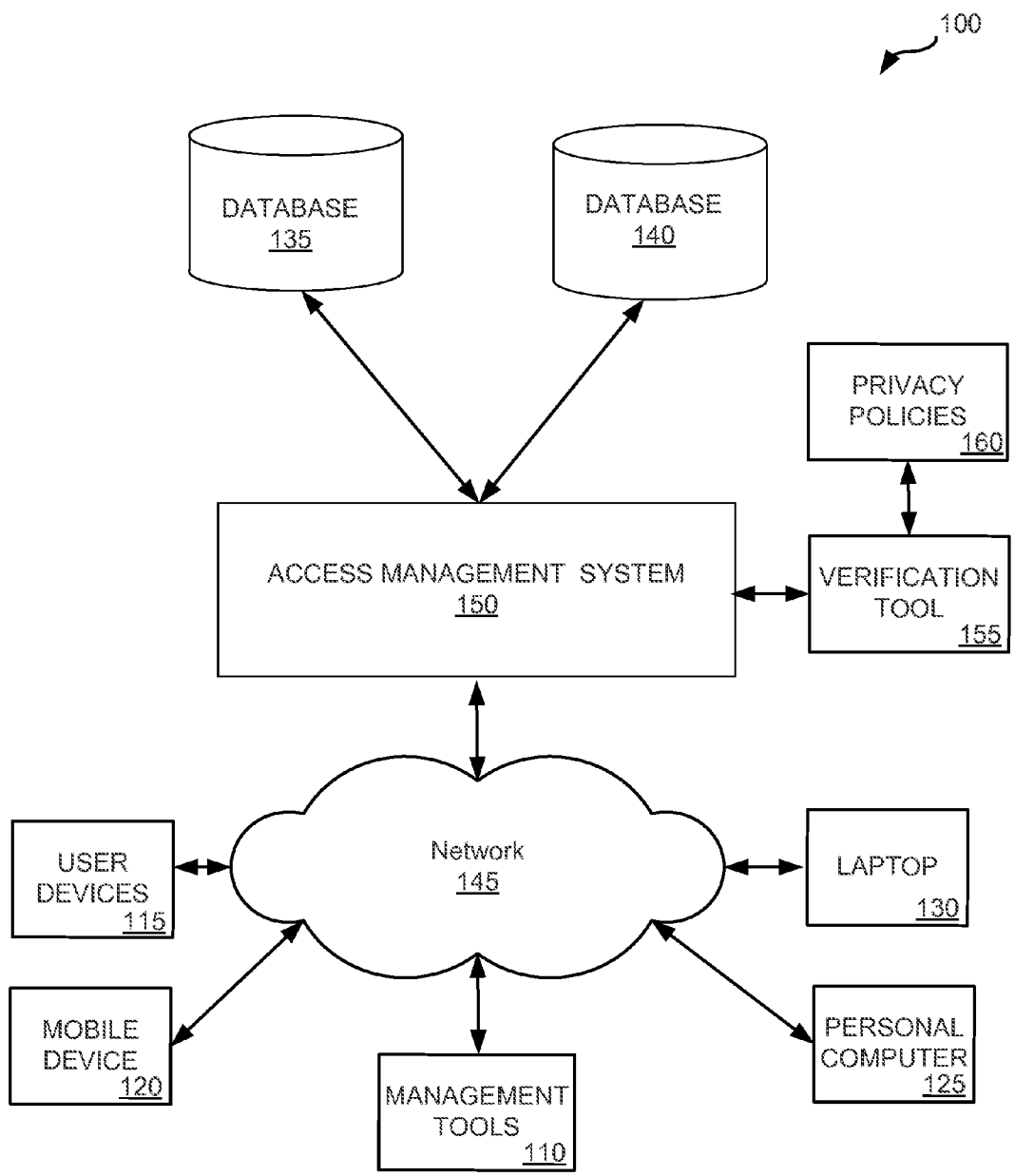
FIG. 1 illustrates an example of a networked-based environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to protecting the privacy of users by verifying access controls to the users' data. In particular, some embodiments provide for a higher-level declarative language for expressing privacy policies which can be verified using a computer-aided verification tool. The verification tool uses the expressed privacy policies along with language-level assumptions and assertions in the verification process. For example, high-level models of the privacy policies can be reduced to a simpler verification representation (e.g., a Boolean representation) based on a set of assertions. This verification representation can then be submitted to a constraint solver (e.g., Satisfiability Modulo Theories solver) for verification.

In addition, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

TERMINOLOGY

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary channels or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

GENERAL DESCRIPTION

FIG. 1 illustrates an example of a networked-based environment 100 in which some embodiments of the present invention may be utilized. Companies can store a tremendous amount of data (e.g., photographs, messages, e-mails, electronic documents, or healthcare records) and related analytics (e.g., usage analytics). The data can be submitted through various management tools 110, user devices 115, mobile devices 120, personal computers 125, laptops 130, and/or other devices to allow the data to be stored on one or more databases 135 and 140. As illustrated in FIG. 1, these devices and tools may use network 145 to submit and retrieve information from the databases 135 and 140. In some cases, each user may also choose to grant and/or restrict access to the user's information stored with the system to other users.

Various embodiments of the present may use access management system 150 to manage the access the users have to the information and data stored on databases 135 and 140. In some embodiments, access management system 150 may use a software language (e.g., the SPS language described in more detail below) to provide storage agnostic means to access data from databases 135 and 140. Access management system 150 may implement and provide server-side or client-side code that enables clients to access data stored in databases 135 and 140. To ensure that the software is performing as desired (i.e., in compliance with a set of privacy policies 160), verification tool 155 can be utilized.

In some embodiments, access controls are implemented at the storage layer of networked-based environment 100, which may be referred to as the "Storage and Privacy Service" (SPS). More specifically, in some implementations, for each object (e.g., each piece of information or each user) stored in networked-based environment 100, its access control, as specified by its owner-user, can be represented as a set of (e.g., one or more) access or privacy rules. In this context, the terms "access rule" and "privacy rule" refer to the same concept and are used interchangeably.

The access rules of each piece of information are stored in connection with that piece of information. In some implementations, the access rules of all the information stored in networked-based environment 100 are stored in a data structure that may be represented as a graph having a number of nodes and edges. When a user requests a specific piece of information stored in networked-based environment 100, the access control of the piece of information is verified and validated with respect to the requester/user by dynamically (e.g., in real time) filtering the graph. In some implementations, a language with a predefined syntax can be used to express the access or privacy rules and the filtering of the graph.

User device 115 can be any computing device capable of receiving user input as well as transmitting and/or receiving data via the network 145. In one embodiment, user device 115 is a conventional computer system, such as a desktop 125 or laptop computer 130. In another embodiment, user device 115 may be mobile device 120 having computer functionality, such as a personal digital assistant (PDA), mobile telephone, smart-phone or similar device. User device 115 is configured to communicate with access management system 150, and/or the financial account provider via the network 145. In one embodiment, user device 115 executes an application allowing a user of user device 115 to interact with the access management system 150. For example, user device 115 can execute a browser application to enable interaction between the user device 115 and access management system 150 via the network 145. In another embodiment, user device 115 interacts with access management system 150 through an application programming interface (API) that runs on the native operating system of the user device 115, such as IOS® or ANDROID™.

User devices 115 can be configured to communicate via the network 145, which may comprise any combination of local area and/or wide area networks, using both wired and wireless communication systems. In one embodiment, network 145 uses standard communications technologies and/or protocols. Thus, network 145 may include links using technologies such as Ethernet, 802.11, worldwide interoperability for microwave access (WiMAX), 3G, 4G, CDMA, digital subscriber line (DSL), etc. Similarly, the networking protocols used on network 145 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 145 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Exemplary Language

In some embodiments, a language with a predefined syntax can be used to express objects (e.g., users, information), connections between specific objects, access control (e.g., access or privacy rules) associated with the information, and filtering of the graph representing the privacy rules. In some implementations, the language can be a declarative language that describes users and objects, connections, and privacy rules (e.g., essentially Thrift for a graph). Different object types may be declared in this language, along with all connection types and the privacy rules associated with the objects. For clarification purposes, embodiments of this language may be referred to as the SPS language.

The syntax of the SPS language may be customized for specific system requirements or specifications. However, the syntax may be modified, when appropriate, to be suitable for other types of systems. The terms may or may not be case sensitive (e.g., depending on the actual implementations). For example, if the terms are not case sensitive, then "Int" and "int" are considered the same term. On the other hand, if the terms are case sensitive, then "Int" and "int are considered two different terms.

The SPS language supports many features. For example, automatic data fetching may be achieved by specifying properties, edges, and fbtypes (defined below). Privacy checking when data are fetched and returned from storage may be achieved by specifying appropriate fields. Undefined values may be used to signal error conditions, such as data fetch failure, and evaluating such undefined values may help determine whether the failure is with the entire request or just a part of the request. With some implementations, the system treats a data retrieval failure as of indeterminate state; to the extent that un-retrievable data (such as due to a temporary network or equipment glitch or due to scheduled maintenance) is not strictly necessary to make an access request determination, then such failure will not deny access so long as there exists a set of definitely retrieved data that clearly authorizes the granting of access.

Type

The primitive or native types are: "Int" (integer), "String" (character string), and "Bool" (Boolean—true or false).

A parameterized type "Set" represents a set of values. A "Set" cannot contain any other "Set"; however a "Set" may contain "Nodes" or "Interfaces" which themselves contain "Sets". A parameterized type "OrderedSet" represents a set of values in a pre-determined order. A "Map" represents a relationship between primitive or native types.

The user defined types are: "Node", "Interface", "Const", and "enum" (enumeration).

A "Node" can have a null value, which indicates the "Node" having an empty value.

"Enums" are similar to their counterparts in other languages, with the exception that each value's "Int" (integer) value representation must be defined. "Enums" are typed, and cannot be used in places where an integer or another "enum" value is expected.

Unknown

All values can be "Unknown". "Unknown" is introduced in the cases of data-fetch failures or attempting to access attributes of null values. Such "Unknown" values are propagated up the expression tree, and ultimately results in a rule to be forcefully denied (if it is a deny), or skipped (if it is an allow).

Incomplete

A "Set" contains an "Incomplete" flag. A "Set" is marked incomplete (e.g., using the "Incomplete" flag) if it may contain more values, but does not because of data-fetch failures. An "Incomplete" flag modifies the results of set operations, causing them to become "Unknown".

Decoding Property Fields

The property fields returned from the distributed graph database implemented by the Facebook system, known as TAO, may have three possible states: "INT", "TEXT", and "ARRAY". When loaded, they are coerced into language types by the following rules:

"INT"→"Int": Trivial.

"INT"→"Object": An object whose "fbid" (Facebook ID) is the integer.

"INT"→"String": The integer's decimal representation.

"TEXT"→"String": Trivial.

"TEXT"→"Int": The string is parsed as a decimal number.

"ARRAY"→"Set<Int>": The JavaScript Object Notation (JSON) input array is treated as a set of integers.

"ARRAY"→"Set<String>": The JSON input array is treated as a set of strings.

"ARRAY"→"Set<Object>": The JSON input is treated as an array of object IDs.

"ARRAY"→"Object": The JSON input is treated as a set of property fields for an object, constructed recursively, with the sub-objects following the same rules. If the input is not a JSON object, return "Unknown".

All non-listed conversions return "Unknown".

For the array conversions, if the input is not an array, the result is "Unknown". If the input is an array, the items in the array should be convertible based on the "INT"/"TEXT"→"Int"/"String" conversions. In the event that the conversion is not possible, the item is excluded and the set is marked "incomplete".

Interface

```
interface : 'interface' IDENT ['implements'
IDENT[',' ...]] '{' interface_items '}'
    interface_item  :   name_decl  |  expr_decl  |
alias_decl | perm_decl | perm_def
```

An "Interface" is declared with a name and optionally the names of the parent "Interfaces" that it implements.

Properties and edges are optionally declared in "Interfaces". Instead, an "Interface" declares attributes that may map to a property, edge, expression, or alias in the "Nodes" that implement the "Interface". An "Interface" can also declare permission names without defining their bodies; however, these permissions must be defined in the implementing class. "Interfaces" may implement other "Interfaces".

Node

```
node : ['extend'] 'node'  IDENT['implements' IDENT[',' ...]] '{'
node_items '}'
node_item :prop_block | edge_block | alias_decl |
expr_decl | perm_def
```

Each "Node" defined maps to a particular object type in the underlying storage. In this context, the terms "node" or "Node" and "object" refer to the same concept and may be used interchangeably. In the case of the Facebook system, each "Node" maps to a concrete object stored in TAO or an object created at the runtime.

A "Node" has properties, which have names and types. The types can be native types (e.g., "Int", "String", "Bool") or other nodes.

A "Node" also defines the edges that are allowed to originate from them.

When the keyword "extend" is present, the body of the declaration is added to the declarations for this "Node". This lets different products add additional permissions or edges that are product specific, without having it all be put into one node-declaration block.

Additional properties cannot be added to a "Node" using "extend".

Property

```
prop_block : 'prop' '{' prop_items '}'
prop_item : type IDENT ['(' prop_options [',' ...] ')'] ';'
prop_options : 'default' ':' static_expr | 'decode' ':' IDENT
```

"Properties" map to the fields of the underlying object.

The "type" indicates the type of the field. When a field contains an ID (e.g., "fbid"), its "type" should be set to the type of the object.

The optional option "default" specifies a field's value if it is missing from the data. If a field is missing a value and the default is not specified, the value of the field becomes "Unknown". Default values can be a constant, literal, null, or the empty set.

The optional option "decode" specifies a named decoding function (provided by the runtime), which decodes the field's raw data and fills it with processed data. This may be useful, for example, for specifying fields of IDs stored as comma separated lists. It is mainly used for legacy reasons. The comma separated list does not support multiple IDs in a field. Instead, associations should be used for such cases.

Edge

```
edge_block : 'edge' '{' edge_items '}'
edge_item : type IDENT ';'
```

"Edges" typically represent associations in the underlying data model.

Generally, the type of an "Edge" is a "Set" of nodes. If the type is a node type instead of a set, then one arbitrary object from the association becomes the value of this edge. If there is no association, the value of the edge becomes null.

The actual mapping of an "Edge" to the underlying association is specified in the "sources" block.

Each "Edge" is stored as a 3-tuple: (object1_id, edge_type, object2_id). The name of the "edge_type" and the name of the type of node the edge leads to are specified.

"Edges" can either be singletons or sets.

There can be multiple edges to the same type with different names. These edges are stored as different "edge_types" in the underlying storage (e.g., TAO in the Facebook system). A separate file (e.g., called_sources.fbobj in the Facebook system) specifies the IDs for object types and edge types in the underlying storage, so the system knows how to load these objects.

Named Expression expr_decl:type IDENT=expr ';'

Named expressions are attributes computed from other attributes. A "Named Expression" can be used in the same way as other types of attributes.

An expression has access to all the bindings that are available to expressions inside permissions.

The value of an expression is lazily computed and cached for each object.

Inside a "Named Expression" block, the following bindings may be used: viewer_context: an object representing the current viewer_context; viewer: the IUser object representing, generally shorthand for "viewer_context.user";

this: the object on which the rule is invoked; and that: if the permission takes an argument, then this is the target object when invoked to do an edge traversal permission check.

Permission perm_def: 'perm' IDENT ['('type')']'{' statements '}'

Permissions are functions that return Boolean ("Bool") values. A "Permission" may be defined to take an optional argument, which is set to the target object when computing permission on an edge traversal.

Inside a "Permission" block, the following bindings may be used:

viewer_context: an object representing the current viewer context;

viewer: the IUser object representing, generally shorthand for "viewer_context.user";

this: the object on which the rule is invoked; and that: if the permission takes an argument, then this is the target object when invoked to do an edge traversal permission check.

Source

```
source_block : 'sources' '{' source_items '}'
source_item  : IDENT '(' source_node_annotation [',' ...] ')'
';' | IDENT '::' IDENT '(' source_edge_annotation [',' ...] ')' ';'
source_node_annotation : 'fbtype' ':' int | 'external'
source_edge_annotation: 'assoc' ':' int | 'empty' | 'external'
```

"Source" is a top-level block. Sources blocks specify the data source for nodes and edges. Every "Node" and "Edge" must have a corresponding "source_item" entry.

The first form of "source_item" specifies the source for nodes, and the second form specifies the source for edges. The possible values are:

"empty": the edge always returns no element, not backed by an external data source; "assoc": the contents of the edge are the result of the TAO assoc (association) query with this assoc type;

"fbtype" (Facebook type): the node is mapped to this "fbtype", and object data are retrieved through a TAO object query; and "external": the node or assoc is not fetched using standard TAO methods, but rather uses runtime-dependent methods.

Constant

```
constants_block : 'constants' IDENT '{' constants_iterms '}'
constants_item : type IDENT '=' static_expr ';' |
'enum' IDENT '{' enum_item [',' ...] '}' enum_item : IDENT '=' INT
```

"Constant" is a top-level block. Constantsblocks create a namespace for a set of constants and enumerations.

Constant values can be assigned a static value. This includes string and integer literals, references to other constants and "enum" (enumeration) values, and set literals. "Constants" are static in nature, with values independent of the executing content such as the specific viewer or owner.

External

```
external_block : 'externals' '{' external_item '}'
external_item : type IDENT '(' type [',' ...] ')'
```

"External" is a top-level block. External block declares functions that are implemented by the runtime.

Statement: Allow/Deny all all_stmt: ('allow'|'deny') 'all' ';'

Unconditionally return with "true" (e.g., if allow) or "false" (e.g., if deny) respectively.

Statement: Conditional cond_stmt: ('allow'|'deny') 'if' expr ';'

Returns "true" or "false" when the condition expression is "true".

|       | condition              |
|-------|------------------------|
|       | true \| false \| Unknown |
| allow | true \| skip \| skip   |
| deny  | false \| skip \| false |

Statement: Return . . . if . . .

return_stmt: 'return' expr 'if' expr ';'

Returns the first argument ("result") if the second argument ("condition") is "true". Otherwise, continue.

| condition | result |
|-----------|--------|
|           | true \| false \| Unknown |
| true      | true \| false \| false |
| false     | skip \| skip \| skip |
| Unknown   | skip \| false \| false |

Expression: Boolean Operations

The Boolean operations are: "&&" (and), "||" (or), and "!" (not).

Boolean operations handle Unknowns gracefully.

Logical AND (&&):

| && | true | false | Unknown |
|----|------|-------|---------|
| true | true | false | Unknown |
| false | false | false | false |
| Unknown | Unknown | false | Unknown |

Logical OR (||):

| \|\| | true | false | Unknown |
|------|------|-------|---------|
| true | true | true | true |
| false | true | false | Unknown |
| Unknown | true | Unknown | Unknown |

Logical NOT (!):

| ! | true | false | Unknown |
|---|------|-------|---------|
|   | false | true | Unknown |

Expression: Equality Comparison

The general comparison operators are "==" (equal), and "!=" (not equal).

Only values of the same type can be compared.

Comparison between objects is done by comparing their IDs. If these objects have no IDs (i.e., special objects generated by the runtime), then the behavior is undefined.

Comparison between sets is done by comparing the objects in each set.

Comparison between other primitive types ("Int", "String", "Bool") is done in the usual manner.

If any of the arguments are "Unknown" (or, in the case of sets, "Incomplete"), the comparison returns "Unknown".

Expression: Binary Arithmetic Operations

Arithmetic operators are defined for "Int" arguments. They are: "+", "−", "*", "/", "<", "<=", ">", and ">=", and behave in the expected manner.

If any of the arguments are "Unknown", the comparison returns "Unknown".

Expression: Binary Set Operations

The set operations are:

"in": test if the left-hand-side (lhs) value is in the right-hand-side (rhs) "Set", using equality as defined previously; if the value is not found and the set is "Incomplete", returns "Unknown";

"intersect": returns a "Set" that includes elements found only in both sets;

"union": returns a "Set" that includes elements of both sets; and

"without": returns a "Set" that includes the values in the lhs "Set" but not in the rhs "Set"; if the rhs "Set" is "Incomplete", an empty "Set" with the "Incomplete" flag set is returned.

Expression: Set Literals expr_set:: '{' expr [',' . . . ] '}'

Returns a "Set" whose elements are the result of the expressions.

If any of the expression returns "Unknown", the "Set" is marked "Incomplete" and that element is not added.

Expression: Filter
expr filter:: '{' IDENT 'in' expr 'if' expr '}'
For the expression {var in expr if pred}, filter the contents of the "Set" returned by "expr" using "pred", and return the "Set" of values for which the predicate evaluates to true.

In the body of the predicate, "var" is bound to the current item being tested.

If the input is incomplete (e.g., marked by the "Incomplete" flag), the output is also marked incomplete. If the predicate returns "Unknown" for an element, that element is not added to the result "Set" and the result is marked incomplete.

Expression: Variable
var: IDENT|IDENT '::' var
Variables cannot be assigned to. There is a set of variables that is bound in expression contexts. Use the scoping form to refer to constants and "enum" values.

Expression: Accessing Attribute
expr_access: expr '.' IDENT
Accessing properties generally results in a data fetch for that object. Accessing edges generally results in an assoc get request to TAO.

Expression: Calling
expr_call: expr '(' expr [',' ... ] ')'|expr. IDENT '(")'
The first form calls an external function.
The second form calls a permission check on the lhs object.

Graph

Figure 2:
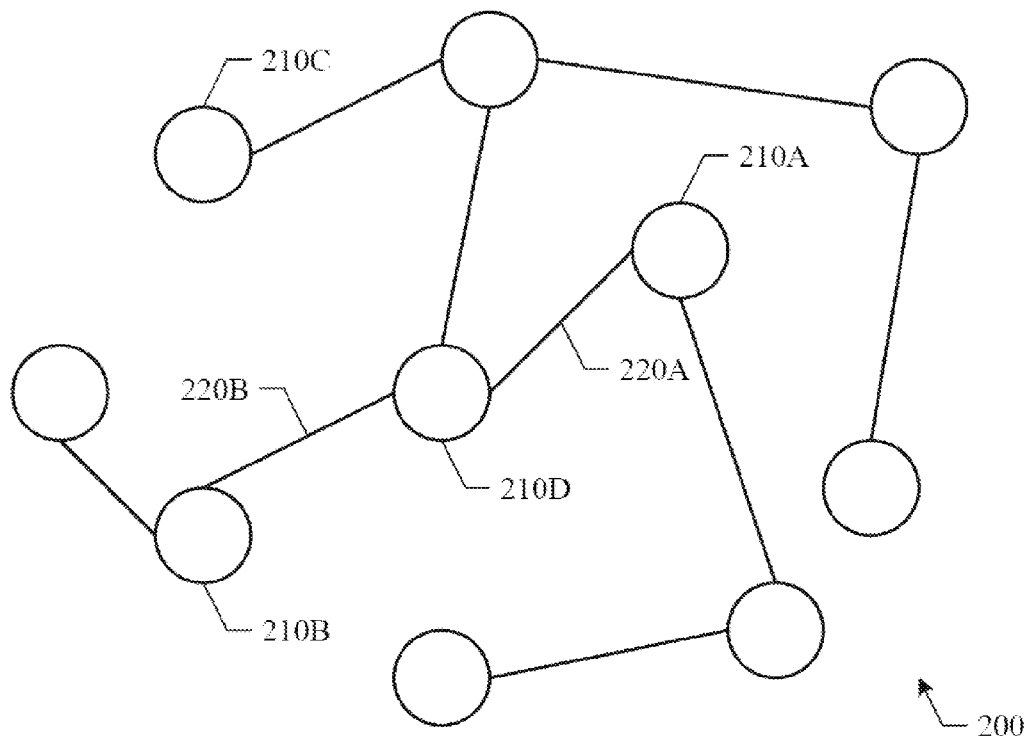
FIG. 2 illustrates an example graph having a number of nodes and edges.

In particular embodiments, information stored in a distributed system may be repressed using a graph have any number of nodes and edges. In the case of a social-networking system (e.g., the Facebook system), such graph may be referred to as a social graph. FIG. 2 illustrates an example graph 200 having a few nodes 210 and edges 220, with each edge 220 connecting two specific nodes 210.

In some embodiments, each node 210 represents an object (e.g., a user, a piece of information, an access rule, a web page, a file, a message, etc.). If there is a direct interaction or relationship between two objects (e.g., two users, two pieces of information, a user and a piece of information), then an edge 220 connects the two corresponding nodes 210 respectively representing the two objects. There may be different types of objects, and thus different types of nodes in graph 200. Similarly, there may be different types of interactions or relationships, and thus different types of edges in graph 200.

In addition, for each edge 220, there may also be associated data indicating how strong the interaction is between the two objects represented by the two corresponding nodes 210 linked by that edge 220. In some implementations, given two nodes 210, an affinity may be determined between these two nodes 210, whether or not there is an edge 220 directly connecting these two nodes 220. In some implementations, the affinity between two nodes 210 may be determined based on past interactions among the objects represented by some or all of nodes 210 in the graph.

In various embodiments, each piece of information stored in the system may be similarly represented as a node in the graph. As an example, suppose that in FIG. 2, nodes 210A, 210B, and 210C represents three different users, User A, User B, and User C, respectively, and node 210D represents a status update posted by User A. In this case, User A is the owner of the status update, and thus edge 220A links nodes 210A and 210D because there is an interaction between User A and the status update (e.g., User A has posted the status update). In addition, further suppose that User A has specified access or privacy rules for the status update he has posted. Specifically, the status update can be shared with User B but not with User C. These access rules may also be reflected or stored in graph 200. For example, edge 220B links nodes 210B and 210D, indicating that the status update can be shared with User B (e.g., User B can view the status update). On the other hand, there are no edge linking nodes 210C and 210D because User C is not authorized to view the status update. In this example, edges 220A and 220B are two different types of edges, indicating two different types of relationships between the nodes linked by them. Edge 220A indicates that node 210A, representing User A, has posted and is the owner of node 210D, representing the status update. Edge 220B indicates that node 210B, representing User B, is authorized to access node 210D, representing the status update.

In particular embodiments, different types of nodes and edges in the graph may be defined according to the language described above (i.e., the SPS language). As an example, for the type of node representing a user, it may be defined as:

```
node User {
    // The properties of the node.
    prop {
        String name;        // native types
        Int version;
        Bool some_boolean;
        PrivacySetting master_privacy;    // type "PrivacySetting"
    is defined separately
    }
    // The edges allowed to originate from the node.
    edge {
        Set<User> friends;      // set of first type of edges to other User
    nodes who are "friends" of this User
        Set<User> blocked_by_users;       // set of second type of
    edges to other User nodes who block this User
        Set<User> blocks_users;      // set of third type of
    edges to other User nodes who are blocked by this User
        Set<Application> apps_owned_by;    // set of fourth type
    of edges to other Application nodes owned by this User
        ContactInfo contact_info;     // singleton edge
    }
    // Expressions for the node.
    // Expressions are for the most part a series of statements of the
    form return <bool> if <predicate> where the predicates are
    either set operations or other expressions.
    Bool is_blocked {
        false if viewer == null;    // viewer is special, it has to
    be passed in to any call} true if this in viewer.blocked_by_users;
        true if viewer in this.blocks_users;
        else false;
    }
    // Control access to different properties and edges and other
        items.
    // Alternatively, access to different properties and edges may be
    controlled based on the results of different expressions.
    Bool can_be_seen {
        true if viewer == this;
        false if is_blocked;
        else true;
    }
    // There may be additional expressions and operations defined
    for the node.
}
```

Each node (e.g., nodes 210 in FIG. 2) representing a specific user may be represented as an instance of the "User" object defined above. Different instances of the "User" object may have their variables (e.g., property or edge variables) set to different values according to the specific users they represent.

In one or more embodiments, there is a type of node in the graph that represents an object that specifies access rules for other types of nodes (e.g., users, pieces of information). Each privacy setting may be an instance of this type of node. The privacy setting for another node (e.g., representing a user) may reference an appropriate node of such type, which is evaluated in the same context (e.g., the same "viewer") at runtime. As an example, the following is a simplified version of the type of node, named "PrivacySetting", representing the object that specifies access rules for other type nodes.

```
node PrivacySetting {
    prop {
        Bool friends_allowed;
        Bool friends_of_friends_allowed;
        Bool everyone_allowed;
        Object object;      // the object this setting applies to
    }
    edge {
        Set<User> excluded;
        Set<User> included;
        Set<Group> groups_included;
    }
    Bool check {
        false if viewer in excluded;
        true if friends_allowed and viewer in object.owner.friends;
        true if friends_of_friends_allowed and { }
!= viewer.friends 'intersect' object.owner.friends;
        true if viewer in included;
        true if { } != viewer.groups_member_of   'intersect'
groups_included;
        else false;
    }
}
```

Compilation

In particular embodiments, the users and objects (e.g., represented as nodes in graph 200) as well as the connections between specific users or objects (e.g., represented as edges in graph 200) in a system (e.g., the Facebook system) may be expressed using the SPS language (e.g., by defining appropriate types of "Nodes", "Edges", etc. and instancing these objects). In addition, all the access or privacy rules in the system may be expressed using the same SPS language (e.g., by declaring appropriate "Properties", "Expressions", etc.). The access or privacy rules thus expressed using the SPS language may be collectively referred to as the "schema" for the information access control in the system. The definitions for different types of objects, expressed using the SPS language, may be stored in a file or several files (e.g., the schema file). As an example, the following is an abbreviated version of a schema file, which illustrates the format of the schema.

```
        object Event {
            prop {
                String title;
                String description;
                Integer startTime;
                Integer endTime;
            }
            edge {
                IUser owner;
                set<PersonalUser> invitations;
            }
            perm can_be_seen {
                allow if viewer == this.owner;
                deny if viewer in this.owner.blocks;
                allow all;
            }
        }
```

In some embodiments, a compiler compiles the schema (i.e., the access or piracy rules expressed in the SPS language) and turns the schema into an abstract syntax tree (AST). In particular embodiments, the compiler for the schema is implemented using the Haskell programming language. The compiler type checks the schema. In various embodiments, the SPS language can be a strictly typed language. Strictly typed languages prevent certain types of mistakes in the source code in comparison to loosely typed languages (e.g., PHP). This is somewhat important to tasks like privacy checking where mistakes are less tolerable. When compiling source code written in the SPS language, the compiler type checks the source code against the schema in order to catch possible errors in the source code that do not agree with what has been defined in the schema. In some implementations, the compiler takes the schema code, which may be expressed in a high level domain specific language, and maps it into a simpler form that is more suitable for evaluation. In fact, any tool that makes such a transformation function as the compiler.

In particular embodiments, the AST of the SPS language may be similar to that of a generic programming language. As an example, the AST may be a Boolean tree of set operations, the evaluation of which requires data fetches from the backing storage (e.g., where the information is stored). The AST may have a predefined syntax.

In some implementations, the AST is expressed as PHP code. The PHP code may reference various PHP libraries and implement functions that compute privacy checks. As an example, a compiler takes the files with the access rules (e.g., the schema) and outputs PHP code. The PHP code is saved into the WWW repository. This PHP code references various PHP libraries and computes privacy checks.

Alternatively, in some implementations, the AST may be expressed as C++ code (e.g., with "Nodes", "Edges", etc. defined as various C++ classes). For example, a compiler takes the files with the access rules and outputs C++ code. The C++ code is then complied to a ".so" file using a C++ compiler (e.g., gcc), which may then be deployed to appropriate servers in the system. A ".so" file is a "shared object" file, which is a dynamically loadable code library format commonly used by many computer programs. The C++ code may reference various runtime C or C++ libraries. At runtime, the ".so" file is loaded into a server shell or PHP extension that includes basic runtime functionalities such as fetching data from storage, reporting status, etc. In some cases, there is a server shell that receives client requests on a Thrift interface and sends them to the ".so" file with the rules. One of the things that the access rules do is fetch data from data storage or data cache server (e.g., TAO). The ".so" code calls back into the server shell, so that the ".so" code is not dependent on a particular version of TAO.

Alternatively, in some implementations, the AST is expressed in a human-friendly language that is easily readable and understandable.

In one or more embodiments, in a distributed system, copies the code expressing the schema as well as the graph may be stored on multiple servers located at different geographical locations.

Runtime

In at least one embodiment, the runtime can be a server shell that, among others, loads the code expressing the schema with the access rule logic. For example, if the schema has been compiled into a ".so" file in the case of using C++ code to express AST, the ".so" file is loaded into the server shell. A server takes requests, sent from clients over the web tier and fetches data from storage (e.g., TAO) as necessary. The server does privacy checks and returns the requested objects (e.g., a piece of information) only if a request passes the check according to appropriate privacy rules. Thus, the requested object is sent to a client only if the request passes the privacy check according to the privacy rules associated with the object.

Suppose that a user, User A, desires to access a piece of information, Information Piece B. In particular embodiments, User A may send a request or query for Information Piece B to a server using a client associated with User A. In some implementations, a query may be expressed in a high-level, declarative form to minimize the amount of data that are sent between the storage (for storing the information) and web (for interfacing with clients) tiers. In some implementations, the query may include a single statement. The query identifies the user requesting the object. As an example, the following code generates a serialized query, which is eventually sent to the data storage tier and executes all of the components of the query, enabling global query planning and minimizing the amount of non-display data sent to the web tier. The user sending the request is identified as "$me" (e.g., using the ID of User A) in the query.

```
GraphQuery::newTaoGraphQuery($me)
    ->get('friends')
    ->sort(COEFFICIENT)
    ->slice(0, 25)
    ->get('photos_tagged_in')
    ->sort(TIME)
    ->slice(0, 10)
```

As another example, the following is a simplified function prototype for requesting a piece of information on behalf of a user. Here, "viewer_id" is used to populate the "viewer" variable in the SPS language; and "object_id" is used to identify the requested object.

```
object GetObject(object_id, viewer_id);
```

As a third example, an interface may be defined to request multiple objects per request. For example, a request may ask for "all photographs posted by User A".

In some embodiments, the code complied from AST is evaluated at runtime. This code may be referred to as an "intermediate language" or "bytecode". When a server conducts the privacy check for a piece of information requested by a user, the bytecode is evaluated to determine whether the user is authorized to access the requested piece of information. The server loads the bytecode for the type of object requested and evaluates it.

In particular embodiments, evaluation of the bytecode involves fetching data and doing set operations (e.g., "in", "intersect"). It is not always necessary to evaluate all nodes of the bytecode (i.e., the Boolean tree) to get a definitive result. For example, any one term of a logical OR ("||") expression being true is sufficient to make the entire expression true. This may lead to algorithms that can improve the efficiency of the tree-evaluation process based on the cost of fetching data in a distributed system. In particular embodiments, a three-state system is used to handle the Boolean tree and its evaluation at runtime when data-fetching errors are countered, which may occur from time to time, especially in a distributed system.

In some implementations, during data fetching, when a fetch error is countered, the error is propagated through the bytecode as the tree is evaluated. This may help give a definitive answer in many cases even when not all data fetches are definitive. More specifically, in particular embodiments, when each function is specified, there is a detailed specification of how the function should behave when an undefined value is taken as input. Thus, when an error is encountered and an undefined value is used as an input to the function, the function is able to handle such undefined value and the error caused it appropriately, thus recovering from the error.

As an example, an evaluation rule may state: "TRUE if a in b or not c in d". To evaluate this rule, first, sets b and d are loaded from storage. A possible error case that may occur in this load step is that some but not all of a set (e.g., set b) is loaded. When this happens, the representation of set b includes the objects that have been able to be loaded, and a marker that the load was incomplete (e.g., using the "Incomplete" flag). In this case, an existence check (e.g., a in b, using the "in" binary set operation) can return a definitive true, but not a definitive false. Specifically, if a is found in the incomplete set b, it may be inferred that a is definitely in the complete set b. However, if a is not found in the incomplete set b, a may still be in the complete set b (e.g., one of those objects in set b failed to be loaded). Thus, to ask "a in b" when set b is potentially incomplete, the possible returns are "true" or "incomplete". Moreover, in this example, if set b is incomplete, the evaluation may still receive a "true" return. But if set d is incomplete, the evaluation can never get a "true" return. In particular embodiments, the set operations are defined such that they correctly honor this notion of incompleteness, and correctly propagate it to dependent operators.

In particular embodiments, careful specification of how functions and operators should behave allows for speculative execution of sub-expressions for the purpose of optimizing overall latency. In some implementations, speculative execution may be used in CPUs to load data from memory for those branches that it is not yet known whether the branches have to be evaluated. Similarly, speculative execution may be used to load data from remote storage before knowing the data are needed. For example, in the case of "a && b", if a evaluates to FALSE, then the evaluation of b is not needed. But if a evaluates to TRUE, b needs to be evaluated. Hence, one strategy is to evaluate both a and b at the same time, and if one side finishes with "FALSE", the evaluation of the other operand can be immediately cancelled. This is in contrast to evaluating a, and then b, in which case a and b are evaluated in sequence, instead of in parallel. Consequently, this system also provides for "automatic parallelization".

Figure 3:
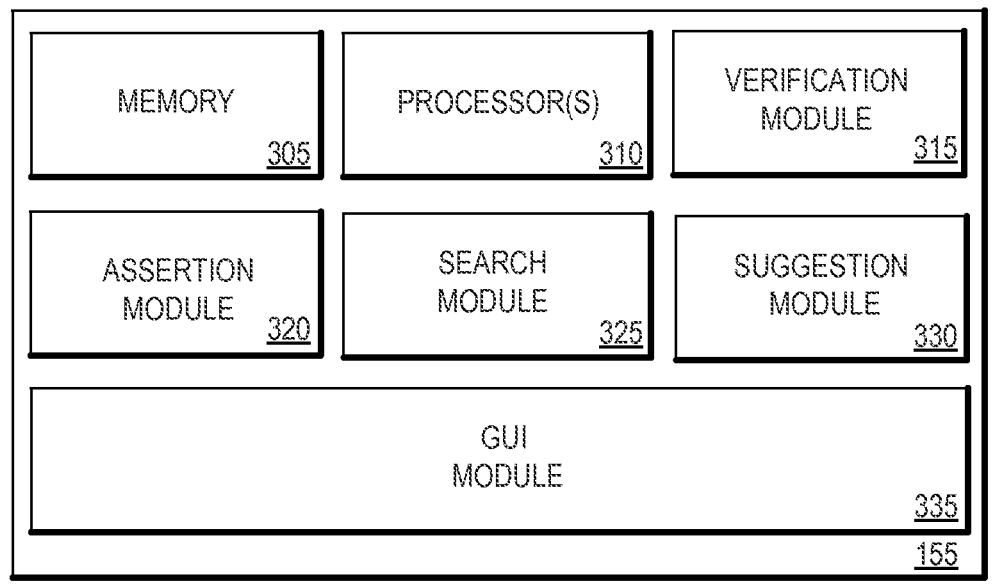
FIG. 3 illustrates components of a verification tool in accordance with various embodiments of the present invention.

FIG. 3 illustrates components of a verification tool 155 in accordance with various embodiments of the present invention. According to the embodiments shown in FIG. 3, verification tool 155 can include memory 305, one or more processors 310, verification module 315, assertion module 320, search module 325, suggestion module 330, and graphical user interface (GUI) module 335. Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module. For example, in one embodiment, verification module 315 and assertion module 320 can be combined into a single module for generating a verification representation.

Memory 305 can be any device, storage media, mechanism, or populated data structure used for storing information. In accordance with some embodiments of the present invention, memory 305 can encompass any type of, but is not limited to, volatile memory, nonvolatile memory, and dynamic memory. For example, memory 305 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 305.

Memory 305 may be used to store instructions for running one or more applications or modules on processor(s) 310. For example, memory 305 could be used in one or more embodiments to house all or some of the instructions needed to execute the functionality of verification module 315, assertion module 320, search module 325, suggestion module 330, and/or graphical user interface module 335.

In accordance with various embodiments, verification module 315 can be configured to receive a program to be tested. Verification module 315 can then generate a verification representation of the program. Generating the verification representation can include reducing the program to a Boolean satisfiability problem and/or to one or more intermediate representations. The intermediate representations of the program can include a Boolean and/or integer representation. In some cases, the verification representation can be simplified based on one or more assertions retrieved from assertion module 320. Since data access decisions usually result in either allowing the access or denying the access, Boolean representations can be useful.

Assertion module 320 can generate one or more assertions (e.g., randomly, systematically, categorically, or based on user inputs and selections) which can be used to evaluate and abstract the program. Search module 325 can then search over the verification representation to determine if the program satisfies the set of privacy policies subject to the one or more assertions. If the program does not satisfy the set of privacy policies, suggestion module 330 can generate one or more suggestions for updating the program or guide an evaluator through portions of the program where the error likely occurs.

GUI module 335 can be used to generate one or more graphical user interface screens. These screens can be used to display information (e.g., privacy policies or suggested fixes) to users. In some embodiments, the graphical user interface screens can be used by the users to create or update the SPS program associated with various data. Still yet, some graphical user interface screens can allow the user to place the program in the access management system for managing access decisions once the program has been verified.

Figure 4:
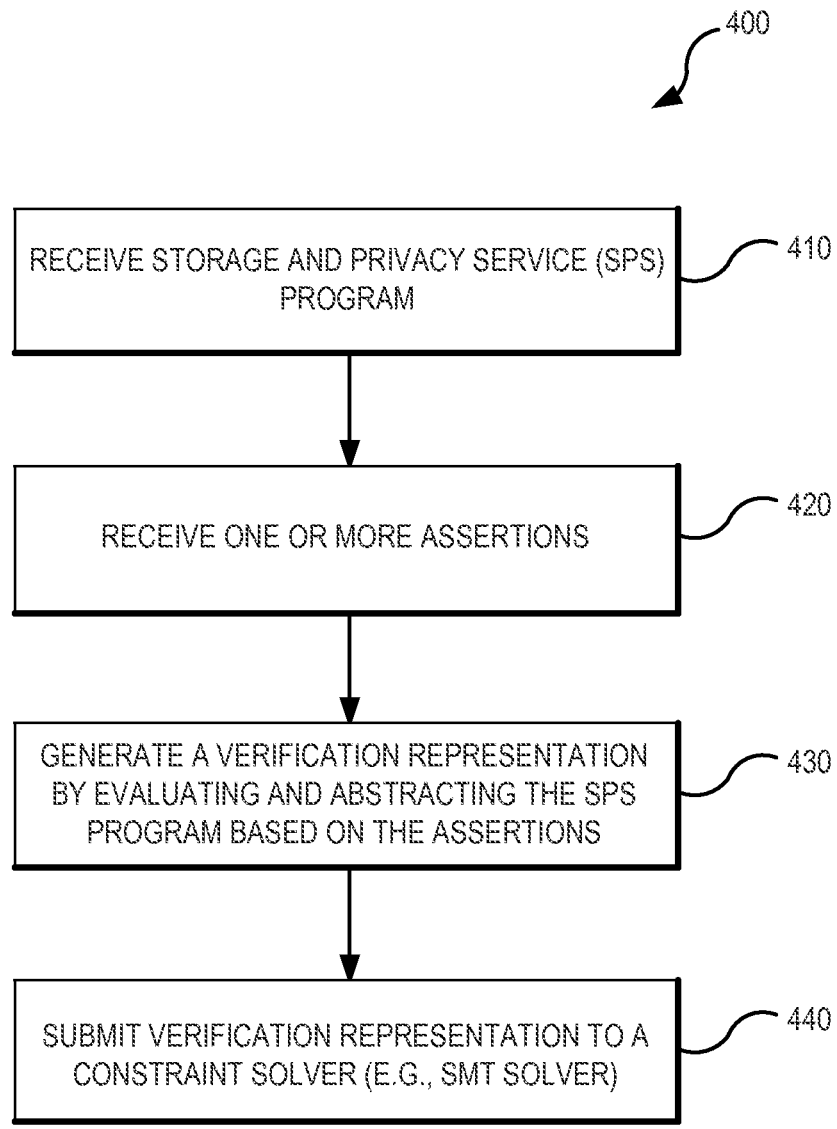
FIG. 4 is a flowchart with a set of operations for verifying a storage and privacy service program in accordance with some embodiments of the present invention.

FIG. 4 is a flowchart with a set of operations 400 for verifying a storage and privacy service program in accordance with some embodiments of the present invention. In accordance with various embodiments, one or more of these operations may be performed by components of the verification tool 155. As illustrated in FIG. 4, program receiving operation 410 receives an SPS program and assertion receiving operation 420 receives one or more assertions to be used to evaluate the SPS program. These assertions can be manually entered by a user, selected from a database of previously existing assertions, and/or automatically generated by assertion module 320.

Generation operation 430 generates a verification representation of the SPS program. The verification representation may be generated, for example, by evaluating and abstracting the SPS program based on the one or more assertions received during assertion receiving operation 420. The verification representation may be a Boolean and integer representation in some embodiments. Submission operation 440 submits the verification representation to a constraint solver (e.g., SMT solver) for evaluation.

Figure 5:
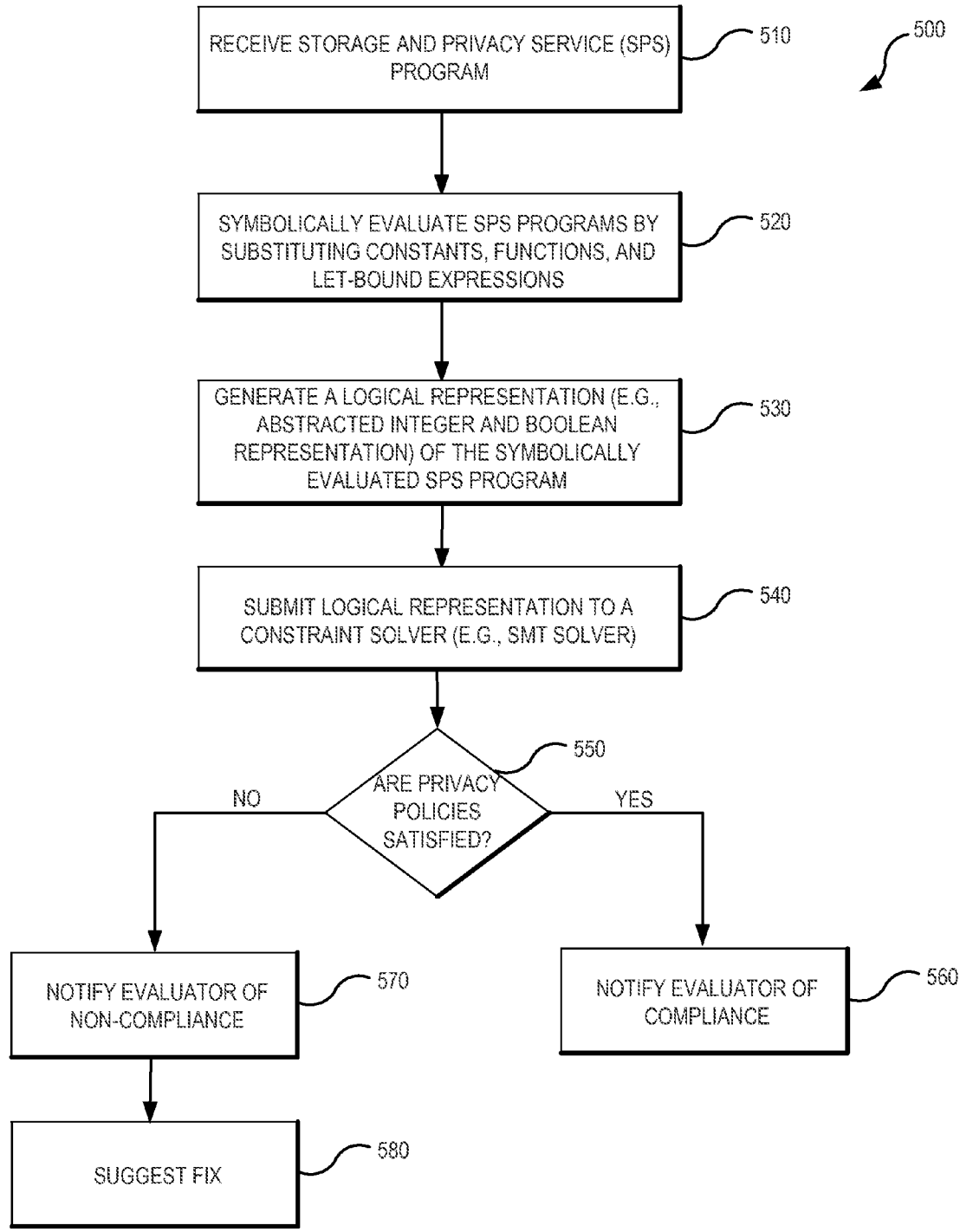
FIG. 5 is a flowchart with a set of operations for verifying a storage and privacy service program and suggesting fixes to ensure compliance with privacy policies in accordance with various embodiments of the present invention.

FIG. 5 is a flowchart with a set of operations 500 for verifying a storage and privacy service program and suggesting fixes to ensure compliance with privacy policies in accordance with various embodiments of the present invention. During receiving operation 510, a SPS program is received to determine compliance with a set of privacy policies. The SPS program can be symbolically evaluated during evaluation operation 520. In some embodiments, constants, functions, and let-bound expression can be appropriately substituted.

Generation operation 530 generates a logical representation of the symbolically evaluated SPS program. In some embodiments, the logical representation can be an abstracted integer and/or Boolean representation. The logical representation generated by generation operation 530 can then be submitted, using submission operation 540, to a constraint solver. Using the outputs from the constraint solver, determination operation 550 determines if the privacy policies are satisfied. If determination operation 550 determines that the privacy policies are satisfied, then determination operation 550 branches to compliance notification operation 560 where an evaluator is notified of the compliance of the SPS program with the privacy policies.

If determination operation 550 determines that the privacy policies are not satisfied, then determination operation 550 branches to non-compliance notification operation 570 where the evaluator is notified of the non-compliance of the SPS program with the privacy policies. In addition, suggestion operation 580 may provide one or more suggested fixes to the SPS program to improve compliance with the privacy policies.

Figure 6:
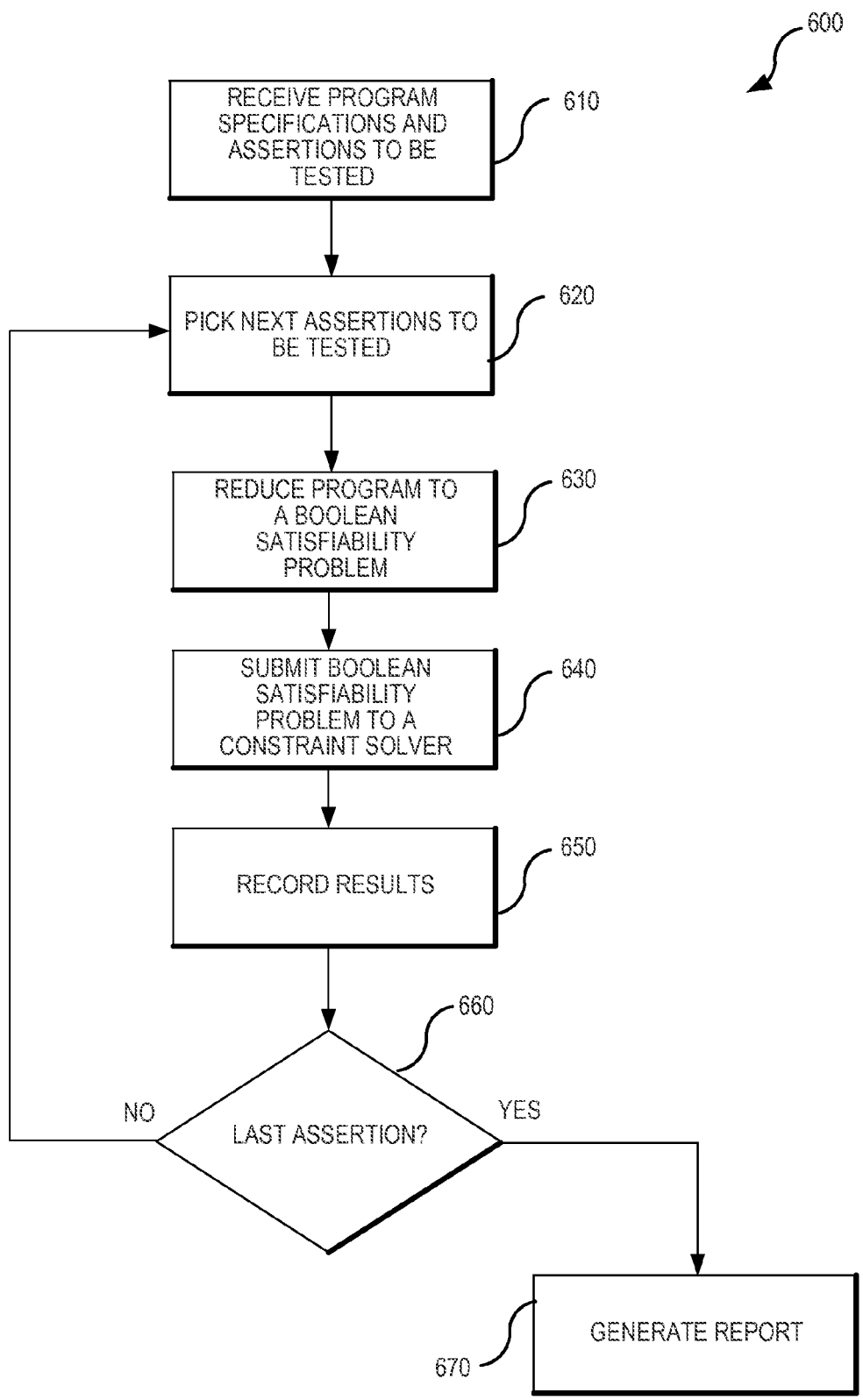
FIG. 6 is a flowchart with a set of operations for generating a privacy policy compliance report in accordance with one or more embodiments of the present invention.

FIG. 6 is a flowchart with a set of operations 600 for generating a privacy policy compliance report in accordance with one or more embodiments of the present invention. As illustrated in FIG. 6, receiving operation 610 receives program specification and assertions to be tested. Picking operation 620 picks the next assertion (or set of assertions) to be tested which are then used to reduce the program to Boolean satisfiability problem during reduction operation 630. Submission operation 640 submits the Boolean satisfiability problem to a constraint solver for evaluation. Recordation operation 650 records the results.

Determination operation 660 then determines if any more assertions (or combination of assertions) remain to be tested. If determination operation 660 determines that additional assertions need to be tested, then determination operation 660 branches to picking operation 620 where the next assertions are selected. If determination operation 660 determines that no additional assertions need to be tested, then determination operation 660 branches to report generation operation 670 where a report summarizing the compliance with a set of privacy policies can be generated.

Social Networking System Architecture

As mentioned above, embodiments of the present invention can be utilized within a social networking system. Typically, a social networking system includes one or more computing devices storing user profiles associated with users and/or other objects as well as connections between users and other users and/or objects. In use, users join the social networking system and then add connections to other users or objects of the social networking system to which they desire to be connected. The users may be individuals or entities such as businesses, organizations, universities, or manufacturers. The social networking system allows its users to interact with each other as well as with other objects maintained by the social networking system. In some embodiments, the social networking system allows users to interact with third-party websites and financial account providers.

Based on stored data about users, objects, and connections between users and/or objects, the social networking system can generate and maintain a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system can modify edges connecting the various nodes to reflect the interactions.

Figure 7:
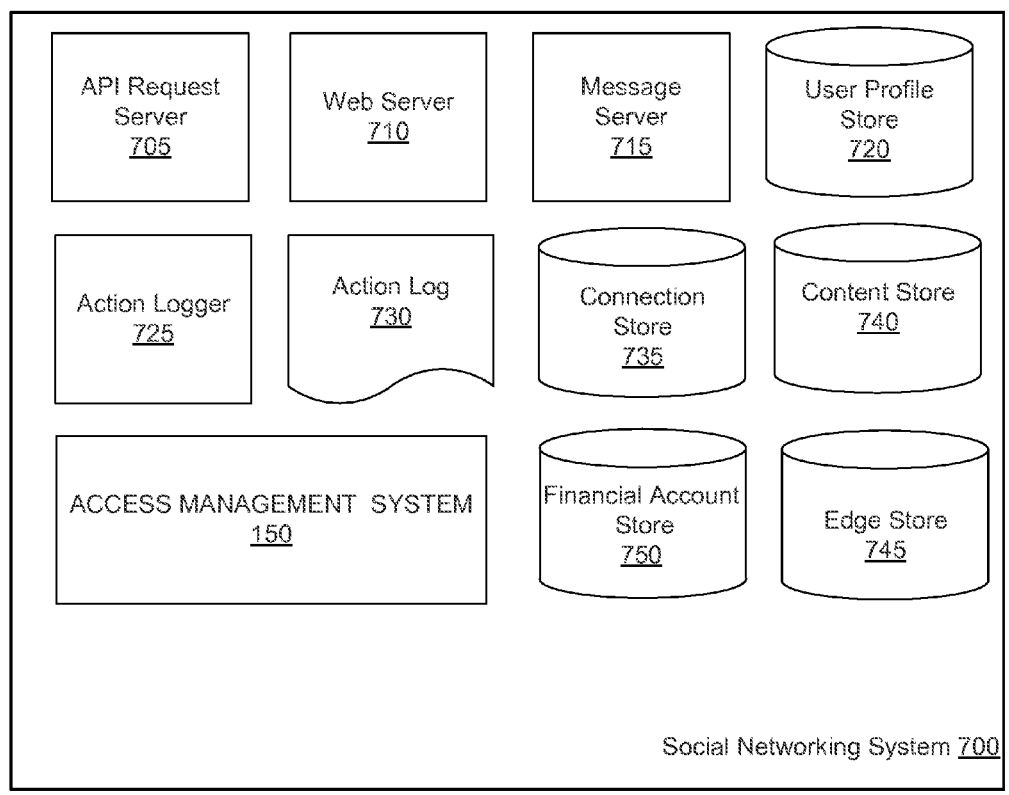
FIG. 7 is a block diagram of a system architecture of the social networking system with which some embodiments of the present invention may be utilized.

FIG. 7 is a block diagram of a system architecture of the social networking system 700 with which some embodiments of the present invention may be utilized. Social networking system 700 illustrated by FIG. 7 includes API request server 705, web server 710, message server 715, user profile store 720, action logger 725, action log 730, connection store 735, content store 740, edge store 745, and financial account store 750. In other embodiments, social networking system 700 may include additional, fewer, or different modules for various applications. Conventional components such as network interfaces, security mechanisms, load balancers, failover servers, management and network operations consoles, and the like are not shown so as to not obscure the details of the system architecture.

API request server 705 allows other systems, user devices, or tools to access information from social networking system 700 by calling APIs. The information provided by the social network may include user profile information or the connection information of users as determined by their individual privacy settings. For example, a system, user device, or tools interested in accessing data connections within a social networking system may send an API request to social networking system 700 via a network. The API request is received at social networking system 700 by API request server 705. API request server 705 processes the request by submitting the access request to access management system 150 where access is determined and any data communicated back to the requesting system, user device, or tools via a network.

Web server 710 links social networking system 700 via a network to one or more client devices; the web server serves web pages, as well as other web-related content, such as Java, Flash, XML, and so forth. The web server 710 may communicate with the message server 715 that provides the functionality of receiving and routing messages between social networking system 700 and client devices. The messages processed by message server 715 can be instant messages, queued messages (e.g., email), text and SMS (short message service) messages, or any other suitable messaging technique. In some embodiments, a message sent by a user to another can be viewed by other users of social networking system 700, for example, by the connections of the user receiving the message. An example of a type of message that can be viewed by other users of the social networking system besides the recipient of the message is a wall post. In some embodiments, a user can send a private message to another user that can only be retrieved by the other user.

Each user of the social networking system 700 is associated with a user profile, which is stored in user profile store 720. A user profile includes declarative information about the user that was explicitly shared by the user, and may also include profile information inferred by social networking system 700. In one embodiment, a user profile includes multiple data fields, each data field describing one or more attributes of the corresponding user of social networking system 700. The user profile information stored in user profile store 720 describes the users of social networking system 700, including biographic, demographic, and other types of descriptive information, such as work experience, educational history, gender, hobbies or preferences, location, and the like. A user profile may also store other information provided by the user, for example, images or videos. In certain embodiments, images of users may be tagged with identification information of users of social networking system 700 displayed in an image. A user profile in user profile store 720 may also maintain references to actions by the corresponding user performed on content items in content store 740 and stored in the edge store 745.

A user profile may be associated with one or more financial accounts, allowing the user profile to include data retrieved from or derived from a financial account. A user may specify one or more privacy settings, which are stored in the user profile, that limit information from a financial account that social networking system 700 is permitted to access. For example, a privacy setting limits social networking system 700 to accessing the transaction history of the financial account and not the current account balance. As another example, a privacy setting limits social networking system 700 to a subset of the transaction history of the financial account, allowing social networking system 700 to access transactions within a specified time range, transactions involving less than a threshold transaction amount, transactions associated with specified vendor identifiers, transactions associated with vendor identifiers other than specified vendor identifiers or any suitable criteria limiting information from a financial account identified by a user that is accessible by social networking system 700. In one embodiment, information from the financial account is stored in user profile store 720. In other embodiments, it may be stored in financial account store 750.

Action logger 725 receives communications about user actions on and/or off social networking system 700, populating action log 730 with information about user actions. Such actions may include, for example, adding a connection to another user, sending a message to another user, uploading an image, reading a message from another user, viewing content associated with another user, attending an event posted by another user, among others. In some embodiments, action logger 725 receives, subject to one or more privacy settings, transaction information from a financial account associated with a user and identifies user actions from the transaction information. For example, action logger 725 retrieves vendor identifiers from the financial account's transaction history and identifies an object, such as a page, in social networking system 700 associated with the vendor identifier. This allows action logger 725 to identify a user's purchases of products or services that are associated with a page, or another object, in content store 740. In addition, a number of actions described in connection with other objects are directed at particular users, so these actions are associated with those users as well. These actions are stored in action log 730.

Action log 730 may be used by social networking system 700 to track user actions on social networking system 700, as well as external websites that communicate information to social networking system 700. Users may interact with various objects on social networking system 700, including commenting on posts, sharing links, and checking-in to physical locations via a mobile device, accessing content items in a sequence or other interactions Information describing these actions is stored in action log 730. Additional examples of interactions with objects on social networking system 700 included in action log 730 include commenting on a photo album, communications between users, becoming a fan of a musician, adding an event to a calendar, joining a group, becoming a fan of a brand page, creating an event, authorizing an application, using an application and engaging in a transaction. Additionally, action log 730 records a user's interactions with advertisements on social networking system 700 as well as other applications operating on social networking system 700. In some embodiments, data from action log 730 is used to infer interests or preferences of the user, augmenting the interests included in the user profile and allowing a more complete understanding of user preferences.

Action log 730 may also store user actions taken on external websites and/or determined from a financial account associated with the user. For example, an e-commerce website that primarily sells sporting equipment at bargain prices may recognize a user of social networking system 700 through social plug-ins that enable the e-commerce website to identify the user of social networking system 700. Because users of social networking system 700 are uniquely identifiable, e-commerce websites, such as this sporting equipment retailer, may use the information about these users as they visit their websites. Action log 730 records data about these users, including webpage viewing histories, advertisements that were engaged, purchases made, and other patterns from shopping and buying. Actions identified by action logger 725 from the transaction history of a financial account associated with the user allow action log 730 to record further information about additional types of user actions.

In some embodiments, social networking system 700 further stores data describing one or more connections between different users in the connection store 735. The data describing one or more connections can include a list of connections, a date each connection (i.e., friendship) was made, etc. The connections may be further defined by users, allowing users to specify their relationships with other users. For example, the connections allow users to generate relationships with other users that parallel the users' real-life relationships, such as friends, co-workers, partners, and so forth. In one embodiment, the connection specifies a connection type based on the type of relationship. Examples of the type of relationship include family, friend, colleague, etc. Users may select from predefined types of connections, or define their own connection types as needed. Some or all of this information may also be stored as edge objects in edge store 745.

Content store 740 stores content items associated with a user profile, such as images, videos or audio files. Content items from content store 740 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of social networking system 700. Examples of social networking content items include suggested connections or suggestions to perform other actions, media provided to, or maintained by, social networking system 700 (e.g., pictures or videos), status messages or links posted by users to the social networking system, events, groups, pages (e.g., representing an organization or commercial entity), and any other content provided by, or accessible via, the social networking system.

Content store 740 also includes one or more pages associated with entities having user profiles in user profile store 720. An entity is a non-individual user of social networking system 700, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in content store 740, allowing social networking system users to more easily interact with the vendor via social networking system 700. A vendor identifier is associated with a vendor's page, allowing social networking system 700 to identify the vendor and/or to retrieve additional information about the vendor from user profile store 720, action log 730 or from any other suitable source using the vendor identifier. In some embodiments, the content store 740 may also store one or more targeting criteria associated with stored objects and identifying one or more characteristics of a user to which the object is eligible to be presented.

In one embodiment, edge store 745 stores the information describing connections between users and other objects on social networking system 700 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in social networking system 700, such as expressing interest in a page on the social networking system, sharing a link with other users of the social networking system, and commenting on posts made by other users of the social networking system. Edge store 745 stores edge objects that include information about the edge, such as affinity scores for objects, interests, and other users. Affinity scores may be computed by social networking system 700 over time to approximate a user's affinity for an object, interest, and other users in social networking system 700 based on the actions performed by the user. Multiple interactions between a user and a specific object may be stored in one edge object in edge store 745, in one embodiment. In some embodiments, connections between users may be stored in user profile store 720, or user profile store 720 may access edge store 745 to determine connections between users.

Exemplary Computer System Overview

Figure 8:
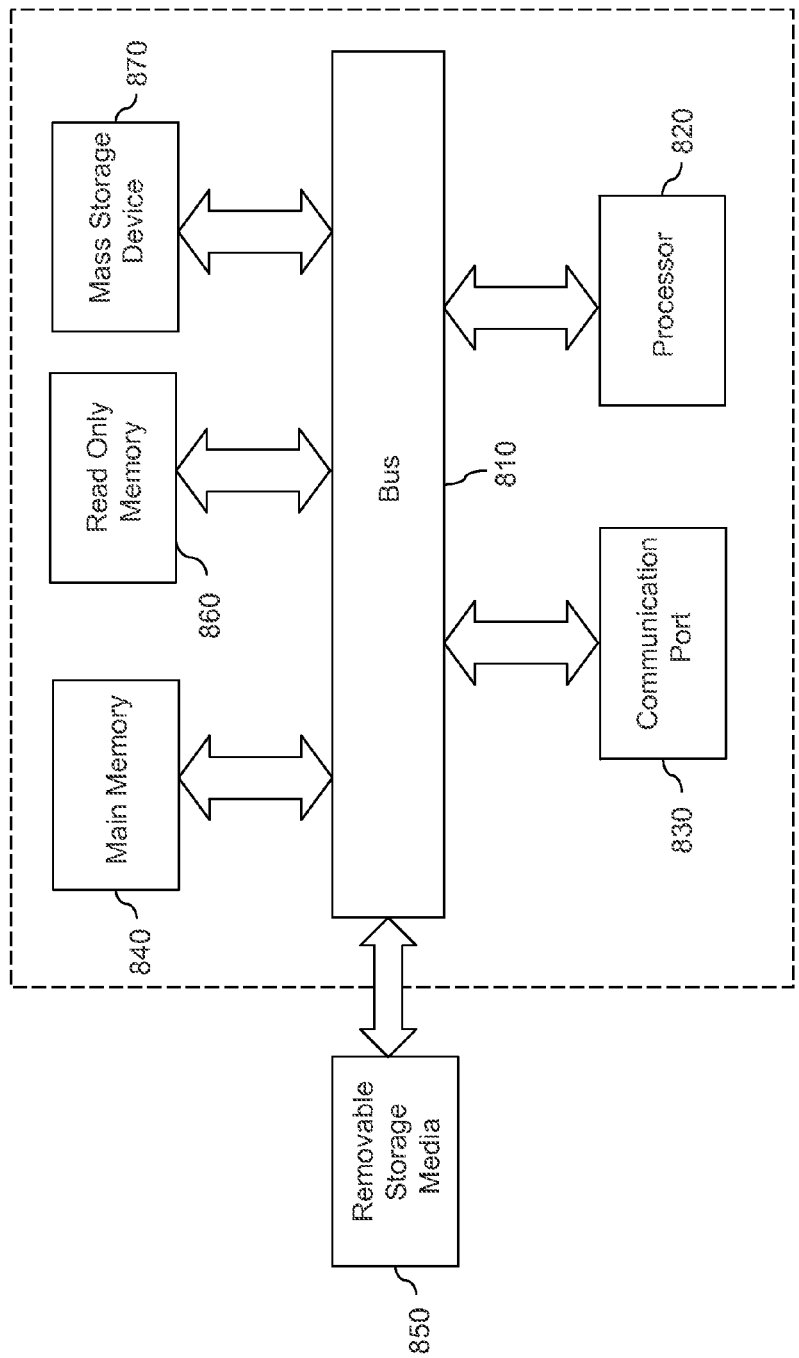
FIG. 8 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present invention may be utilized. According to the present example, the computer system includes a bus 810, at least one processor 820, at least one communication port 830, a main memory 840, a removable storage media 850, a read only memory 860, and a mass storage 870.

Processor(s) 820 can be any known processor, such as, but not limited to, ARM or x86-type processors, such as an Intel® Itanium® or Itanium 2® processor(s); AMD® Opteron® or Athlon MP® processor(s); or Motorola® lines of processors.

Communication port(s) 830 can be any of an RS-232 port for use with a modem-based dialup connection, a 10/100 Ethernet port, or a Gigabit port using copper or fiber. Communication port(s) 830 may be chosen depending on a network such as a Local Area Network (LAN), Wide Area Network (WAN), or any network to which the computer system 800 connects. The communication port 830 may also encompass wireless communications components, such as an IEEE 802.11, 3G/4G or other wireless transceiver.

Main memory 840 can be Random Access Memory (RAM) or any other dynamic storage device(s) commonly known in the art. Read only memory 860 can be any static storage device(s) such as Programmable Read Only Memory (PROM) chips for storing static information such as instructions for processor 820.

Mass storage 870 can be used to store information and instructions. For example, hard disks such as the Adaptec® family of SCSI drives, an optical disc, an array of disks such as RAID, such as the Adaptec family of RAID drives, or any other mass storage devices may be used.

Bus 810 communicatively couples processor(s) 820 with the other memory, storage and communication blocks. Bus 810 can be a PCI/PCI-X or SCSI based system bus depending on the storage devices used.

Removable storage media 850 can be any kind of external hard-drives, floppy drives, IOMEGA® Zip Drives, Compact Disc-Read Only Memory (CD-ROM), Compact Disc-Rewritable (CD-RW), and/or Digital Video Disk-Read Only Memory (DVD-ROM).

The components described above are meant to exemplify some types of possibilities. In no way should the aforementioned examples limit the scope of the invention, as they are only exemplary embodiments.

In conclusion, the present invention provides novel systems, methods and arrangements for a privacy verification tool. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations that fall within the scope of the claims, together with all equivalents thereof. Therefore, the above description should not be taken as limiting the scope of the invention, which is defined by the appended claims.

What is claimed is:

1. A method comprising:
   retrieving, from a storage location, a storage and privacy service (SPS) program expressing one or more access control rules;
   generating, using a processor, a verification representation of the SPS program based on one or more assertions, wherein the verification representation includes a specification of how a function within the verification representation will respond to an undefined value received as an input, and wherein the undefined value is used to signal a data fetch request failure and to determine whether the data fetch request failure is with an entire data fetch request or a part of the data fetch request;
   submitting the verification representation to a constraint solver to generate a set of access control outputs; and
   determining if the set of access control outputs returned from the constraint solver satisfy a desired set of privacy constraints.

2. The method of claim 1, further comprising generating one or more suggestions to fix the SPS program if the set of access control outputs do not satisfy the desired set of privacy constraints.

3. The method of claim 1, wherein generating the verification representation of the SPS program includes evaluating and abstracting the SPS program based on the one or more assertions.

4. The method of claim 1, wherein generating the verification representation includes generating an intermediate representation by evaluating the SPS program by substituting constants, functions, and let-bound expressions.

5. The method of claim 4, wherein generating the verification representation further includes transforming an intermediate representation of the SPS program into a Boolean and integer representation.

6. The method of claim 1, wherein generating the verification representation includes reducing the program to a Boolean satisfiability problem.

7. The method of claim 1, wherein the SPS program includes one or more nodes which identify properties, edges, and node variables.

8. The method of claim 7, wherein the node variables identify node field access, data structure traversals, arithmetic operations, or Boolean operations.

9. A system comprising:
   a processor;
   a database having stored thereon a program written in a declarative language used to enforce a set of privacy policies;
   a verification module, under control of the processor, to retrieve the program from the database and generate a verification representation of the program, wherein the verification representation includes a specification of how a function within the verification representation will respond to an undefined value received as an input, and wherein the undefined value is used to signal a data fetch request failure and to determine whether the data fetch request failure is with an entire data fetch request or a part of the data fetch request; and
   a search module, under control of the processor, to search over the verification representation to determine if the program satisfies the set of privacy polices.

10. The system of claim 9, wherein the verification module reduces the program to a Boolean satisfiability problem.

11. The system of claim 9, wherein the verification representation includes an intermediate representation of the program into a Boolean and integer representation.

12. The system of claim 9, further comprising an assertion module, under control the processor, to generate one or more assertions.

13. The system of claim 12, wherein the verification module receives the one or more assertions and evaluates and abstracts the program based on the one or more assertions.

14. The system of claim 9, further comprising a suggestion module, under control of the processor, to generate one or more suggestions for updating the program when a determination is made that the program does not satisfy the set of privacy policies.

15. The system of claim 9, further comprising a graphical user interface, under control the processor, to aid a user in creating and testing the program.

16. A computer-implemented method comprising:
retrieving a storage and privacy service (SPS) program expressing one or more access control rules defining data access within a social networking system;
receiving one or more assertions to test compliance of the SPS program in view of a set of privacy constraints;
generating, using a processor, a logical representation of the SPS program based on the one or more assertions, wherein the logical representation includes Boolean variables and includes a specification of how a function within the logical representation will behave to an undefined value received as an input, and wherein the undefined value is used to signal a data fetch request failure and to determine whether the data fetch request failure is with an entire data fetch request or a part of the data fetch request; and
searching over assignments to the Boolean variables in the logical representation of the SPS program to determine if the SPS program satisfies the privacy constraints.

17. The computer-implemented method of claim 16, wherein searching over the assignments includes submitting the logical representation to a constraint solver to generate a set of access control responses of the SPS program in view of the one or more assertions.

18. The computer-implemented method of claim 16, further comprising generating a graphical user interface that includes one or more suggestions to fix the SPS program if the SPS program does not satisfy the privacy constraints.

19. The computer-implemented method of claim 16, wherein generating the logical representation of the SPS program includes generating an intermediate representation by evaluating the SPS program by substituting constants, functions, and let-bound expressions.

20. The computer-implemented method of claim 19, wherein generating the verification representation further includes transforming the intermediate representation into a Boolean and integer representation.

* * * * *